United States Patent
Rasanen

(10) Patent No.: US 10,715,606 B2
(45) Date of Patent: Jul. 14, 2020

(54) APPLICATION CONTROL INTERWORKING IN NETWORK

(71) Applicant: NOKIA SOLUTIONS AND NETWORKS OY, Espoo (FI)

(72) Inventor: John Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 433 days.

(21) Appl. No.: 15/507,351

(22) PCT Filed: Sep. 1, 2014

(86) PCT No.: PCT/EP2014/068491
§ 371 (c)(1),
(2) Date: Feb. 28, 2017

(87) PCT Pub. No.: WO2016/034192
PCT Pub. Date: Mar. 10, 2016

(65) Prior Publication Data
US 2017/0289278 A1    Oct. 5, 2017

(51) Int. Cl.
*H04L 29/08* (2006.01)
*H04L 12/14* (2006.01)
(Continued)

(52) U.S. Cl.
CPC .......... *H04L 67/16* (2013.01); *H04L 12/1407* (2013.01); *H04L 41/0893* (2013.01); *H04L 43/028* (2013.01)

(58) Field of Classification Search
CPC .. H04L 67/16; H04L 41/0893; H04L 12/1047
See application file for complete search history.

(56) References Cited

U.S. PATENT DOCUMENTS 8,718,075 B2 * 5/2014 Cai ..................... H04L 47/11
370/401
9,716,629 B2 * 7/2017 Rasanen ............ H04L 41/0873
(Continued)

OTHER PUBLICATIONS

Smart Middleware for Mutual Service-Network Awareness in Evolving 3GPP Networks—IEEE-Xplore-2008 (Year: 2008).*
(Continued)

*Primary Examiner* — Michael A Keller
*Assistant Examiner* — Jsing Forng Lin
(74) *Attorney, Agent, or Firm* — Squire Patton Boggs (US) LLP

(57) ABSTRACT

Various communication systems may benefit from application control interworking in a network to expose certain service capabilities. For example, certain communication systems of the third generation partnership project (3GPP) that provide service capabilities that are exposed to application providers, for example, via open mobile alliance-application programming interface, may benefit from application control interworking in a network. Further, an application programming interface and the 3GPP system can act together to expose 3GPP service capabilities. A method may include receiving parameters of capabilities relating to an application server at a policy and charging rules function. The method may also include creating application detection and control rules based on the parameters received.

4 Claims, 8 Drawing Sheets

(51) Int. Cl.
*H04L 12/24* (2006.01)
*H04L 12/26* (2006.01)

(56) References Cited

U.S. PATENT DOCUMENTS

| | | | | |
|---|---|---|---|---|
| 2011/0145895 | A1* | 6/2011 | Zhang | H04L 47/10 726/4 |
| 2011/0202653 | A1* | 8/2011 | Riley | H04L 12/14 709/224 |
| 2012/0220330 | A1* | 8/2012 | Goldner | H04L 12/1407 455/517 |
| 2013/0054800 | A1* | 2/2013 | Fernandez Alonso | H04L 67/2842 709/224 |
| 2013/0279521 | A1* | 10/2013 | Perez Martinez | H04L 12/1407 370/468 |
| 2013/0288668 | A1 | 10/2013 | Pragada et al. | |
| 2015/0134729 | A1* | 5/2015 | Lim | H04L 67/16 709/203 |
| 2016/0295390 | A1* | 10/2016 | Gonzalez De Langarica | H04M 3/4931 |

OTHER PUBLICATIONS

International Search Report & Written Opinion dated Jul. 17, 2015 corresponding to International Patent Application No. PCT/EP2014/068491.
3GPP TS 29.214 V12.4.1 (Jul. 2014), Technical Specification, 3rd Generation Partnership Project; Technical Specification Group Core Network and Terminals; Policy and Charging Control over Rx reference point (Release 12), Jul. 3, 2014, pp. 1-61, XP050774570.
Huawei et al.: "The PCC supports TDF-bypass Operations," 3GPP Draft; S2-113135, 3GPP TSG SA WG2 Meeting #85, Jul. 10-15, 2011, Naantali, Finland, Jul. 5, 2011, XP050548457.
Albayrak et al Smart Middleware for Mutual Service-Network Awareness in Evolving 3GPP Networks; 2008.
3GPP TS 23.203 V12.4.0 (Mar. 2014); 3rd Generation Partnership Project; Technical Specification Group Services and System Aspects; Policy and charging control architecture (Release 12).
3GPP TS 29.212 V12.4.0 (Mar. 2014); 3rd Generation Partnership Project; Technical Specification Group Core Network and Terminals; Policy and Charging Control (PCC); Reference points (Release 12).
TeliaSonera, S2-141067, CS/PS coordination for CS fallback, SA WG2 Meeting #102, Mar. 24-28, 2014, St. Julian's, Malta, 3GPP.
NEC et al, S2-141206, Applicability and evaluation of static congestion mitigation policies, SA WG2 Meeting #102, Mar. 24-28, 2014, St. Julian's, Malta, 3GPP.
Alcatel-Lucent, S2-141587, AESE Architecture, SA WG2 Meeting #102, Phoenix, USA, May 19-23, 2014, 3GPP.
ZTE, S2-141632, Architecture Consideration for AESE, SA WG2 Meeting #102, May 19-23, 2014, Phoenix, Arizona, USA, 3GPP.
Intel, S2-141713, AESE TR Scope, SA WG2 Meeting #103, May 19-23, 2014, Phoenix, Arizona, USA, 3GPP.
Intel, S2-141714, Key issue—Service Capability Exposure Framework, SA WG2 Meeting #103, May 19-23, 2014, Phoenix, Arizona, USA. 3GPP.
Intel, S2-141718, Correction to AESE WID timelines, SA WG2 Meeting #103, May 19-23, 2014, Phoenix, Arizona, USA, 3GPP.
Huawei, S2-141895, Proposed Service Capability Exposure Framework Model, SA WG2 Meeting #103, May 19-23, 2014, Phoenix, Arizona, USA, 3GPP.
Communication pursuant to Rule 164(2)(b) and Article 94(3) EPC dated Aug. 22, 2019 corresponding to European Patent Application No. 14758386.8.
3GPP TR 23.708 V0.2.0 (Aug. 2014), Technical Report, 3rd Generation Partnership Project; Technical Specification Group Services and System Aspects; Architecture Enhancements for Service Capability Exposure; (Release 13), Aug. 18, 2014, XP050835293.
Francois Jammes et al., "Orchestration of Service-Oriented Manufacturing Processes," 10th IEEE International Conference on Emerging Technologies and Factory Automation, IEEE, vol. 1, Sep. 19, 2005, pp. 617-624, XP010905385.

* cited by examiner

APPLICATION CONTROL INTERWORKING IN NETWORK

BACKGROUND

Field

Various communication systems may benefit from application control interworking in a network to expose certain service capabilities. For example, certain communication systems of the third generation partnership project (3GPP) that provide service capabilities that are exposed to application providers, for example, via open mobile alliance-application programming interface (OMA-API(s)), may benefit from application control interworking in a network. Further, an application programming interface (API) and the 3GPP system can act together to expose 3GPP service capabilities.

Description of the Related Art

Architecture Enhancements for Service Capability is a new item being worked on by 3GPP. For example, 3GPP has been aiming at normative specifications within 3GPP Rel-13. A number of measures can be applied either separately, or in various combinations to define and optimize the network architecture and required/related control procedures and interactions between network entities for introducing service capability exposure and enablement support in 3GPP specifications.

When the service capability exposure is applied to a mobile network that also supports application detection and control (ADC), the network also applies, as per current specifications, the ADC to the traffic between the user equipment (UE) and the application server (AS). This is described, for example, in 3GPP Technical Specification 23.203 and 29.212. In case of some servers and/or applications, this may cause redundant activities with parallel processing for the same purpose, extra message exchanges and bearer establishments or modifications that should be rectified as soon as the wanted information is available from the application server. This can be prevented with a simple configuration measure that excludes the servers from the list of possibly detectable applications by a traffic detection function (TDF). For example, one configuration measure may be to exclude the Internet Protocol (IP) addresses of the servers from the list of possibly detectable applications by TDF.

In order to optimize the network architecture and the policy and/or charging control of applications, it may be desirable in some cases to apply ADC to the traffic between a UE and an application server. Thus, for such cases, the configuration measure can close doors for optimization of the network architecture and for the optimization of policy and charging control procedures of different application servers and/or applications.

SUMMARY

According to certain embodiments, a method can include receiving parameters of capabilities relating to an application server at a policy and charging rules function. The method can also include creating application detection and control rules based on the parameters received.

According to certain embodiments, a method can include receiving at least one of capabilities, application related capabilities and parameters for different applications from an application server. The method can also include providing the at least one of capabilities, application related capabilities and parameters for different applications to a policy and charging rules function in response to a request from the policy and charging rules function for the capabilities or parameters.

According to certain embodiments, a method can include maintaining at least one of a plurality of indicators indicated to a service capability function. The method can also include indicating, from an application server to the service capability function, the plurality of indicators related to the application server.

An apparatus, according to certain embodiments, can include at least one processor and at least one memory including computer program code. The at least one memory and the computer program code can be configured to, with the at least one processor, cause the apparatus at least to receive parameters of capabilities relating to an application server at a policy and charging rules function. The at least one memory and the computer program code can also be configured to, with the at least one processor, cause the apparatus at least to create application detection and control rules based on the parameters received.

An apparatus, in certain embodiments, can include means for receiving parameters of capabilities relating to an application server at a policy and charging rules function. The apparatus can also include means for creating application detection and control rules based on the parameters received.

An apparatus, according to certain embodiments, can include at least one processor and at least one memory including computer program code. The at least one memory and the computer program code can be configured to, with the at least one processor, cause the apparatus at least to receive at least one of capabilities, application related capabilities and parameters for different applications from an application server. The at least one memory and the computer program code can also be configured to, with the at least one processor, cause the apparatus at least to provide the at least one of capabilities, application related capabilities and parameters for different applications to a policy and charging rules function in response to a request from the policy and charging rules function for the capabilities or parameters.

An apparatus, in certain embodiments, can include means for receiving at least one of capabilities, application related capabilities and parameters for different applications from an application server. The apparatus can also include means for providing the at least one of capabilities, application related capabilities and parameters for different applications to a policy and charging rules function in response to a request from the policy and charging rules function for the capabilities or parameters.

An apparatus, according to certain embodiments, can include at least one processor and at least one memory including computer program code. The at least one memory and the computer program code can be configured to, with the at least one processor, cause the apparatus at least to maintain at least one of a plurality of indicators indicated to a service capability function. The at least one memory and the computer program code can also be configured to, with the at least one processor, cause the apparatus at least to indicate, from an application server to the service capability function, the plurality of indicators related to the application server.

An apparatus, in certain embodiments, can include means for maintaining at least one of a plurality of indicators indicated to a service capability function. The apparatus can also include means for indicating, from an application server to the service capability function, the plurality of indicators related to the application server.

BRIEF DESCRIPTION OF THE DRAWINGS

For proper understanding of the invention, reference should be made to the accompanying drawings, wherein.

DETAILED DESCRIPTION

Figure 1:
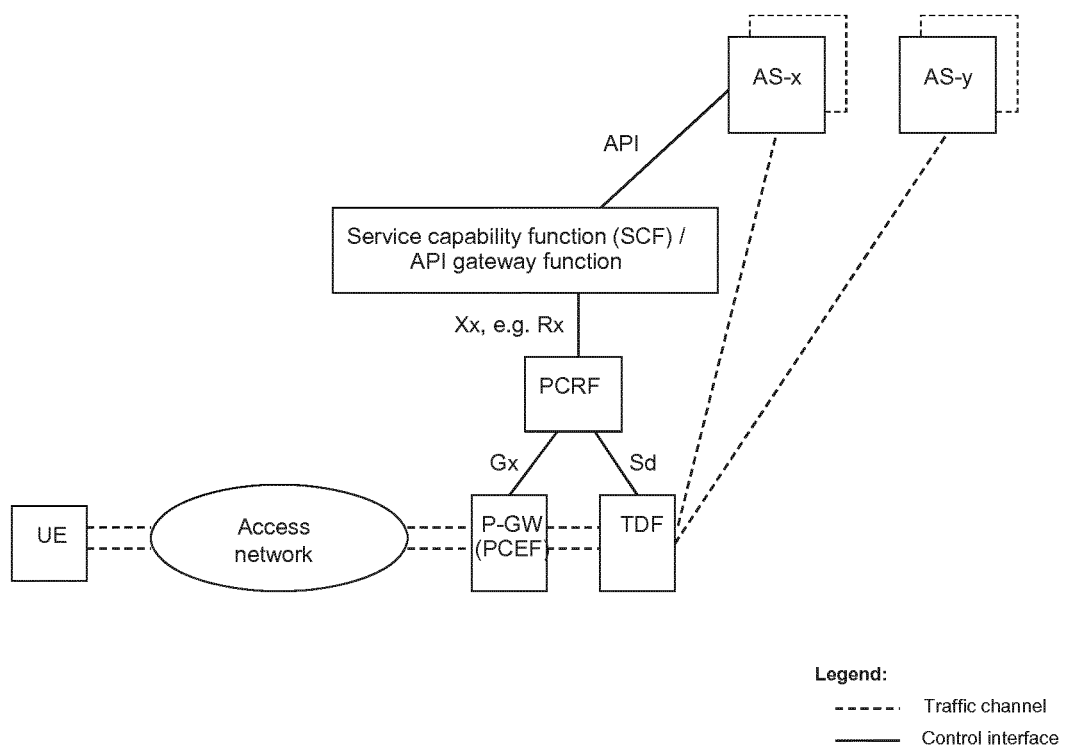
FIG. 1 illustrates a basic, simplified architecture example, when a proposal is applied to a 3GPP environment, according to certain embodiments.

Certain embodiments may provide a simplified architecture, when service exposure is applied to a 3GPP network. An example of such architecture is shown in FIG. 1, which is based on 3GPP. According to FIG. 1, service exposure can be based on information exchange between an application server (AS-x) through an API and a service capability function (SCF)/API gateway function.

FIG. 1 also shows a UE in communication with an access network, which is in communication with a packet data network gateway (P-GW). The P-GW may include a policy and charging enforcement function (PCEF). The P-GW is in communication with a TDF. The P-GW is also in communication with a policy and charging rules function (PCRF) via a Gx interface. The TDF is also in communication with the PCRF via an Sd interface. The TDF is further in communication with AS-x and AS-y. FIG. 1 further shows that the PCRF is in communication with the SCF/API gateway function via an interface Xx defined as, for example, an Rx interface.

According to certain embodiments, various measures that can be applied separately or in various combinations can be obtained in light of the simplified architecture shown in FIG. 1. For example, the AS-x may indicate, in addition to its own identity, such as for example, an IP address, one or more issues to the SCF/API gateway (GW) function. For example, one issue may include whether or not the AS-x supports a control interface to provide session information to the network, such as for example, to PCRF, when a user session is established between a UE and the AS-x. This determination can be used by the network (PCRF, TDF), for example, for deciding whether the ADC should be applied to applications running on the AS-x.

Another issue may include adding granularity to the step above in the case where the AS-x supports provisioning of session information. For example, the addition of granularity may involve per application or per service, whether or not session information is provided for the application, when it is activated. Activation may occur, for example, when an application session is established between the UE and AS-x. This issue can be used by the network, such as PCRF, for example, for deciding on to which applications the ADC should be applied, and to which applications the ADC should not be applied.

Figure 2:
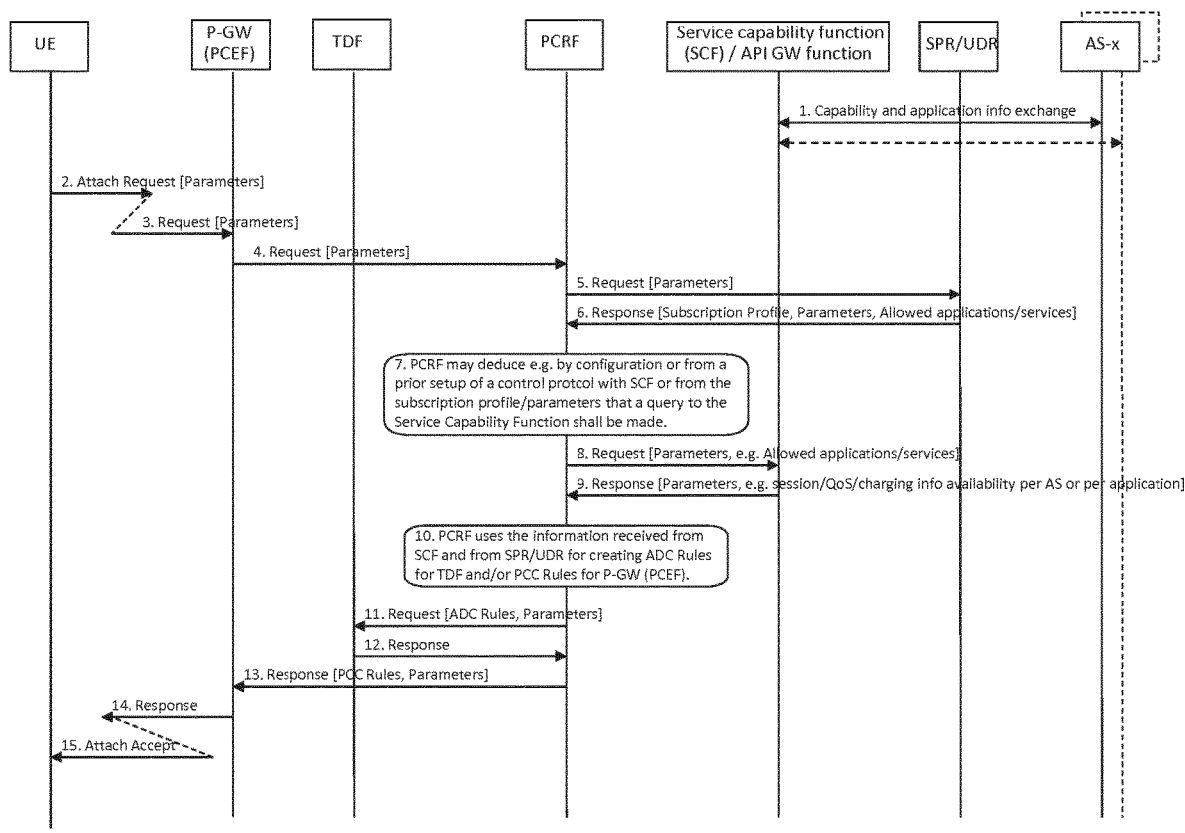
FIG. 2 illustrates a signaling scenario wherein an application server and network exchange information and a user equipment attaches to the network, according to certain embodiments.
Figure 3:
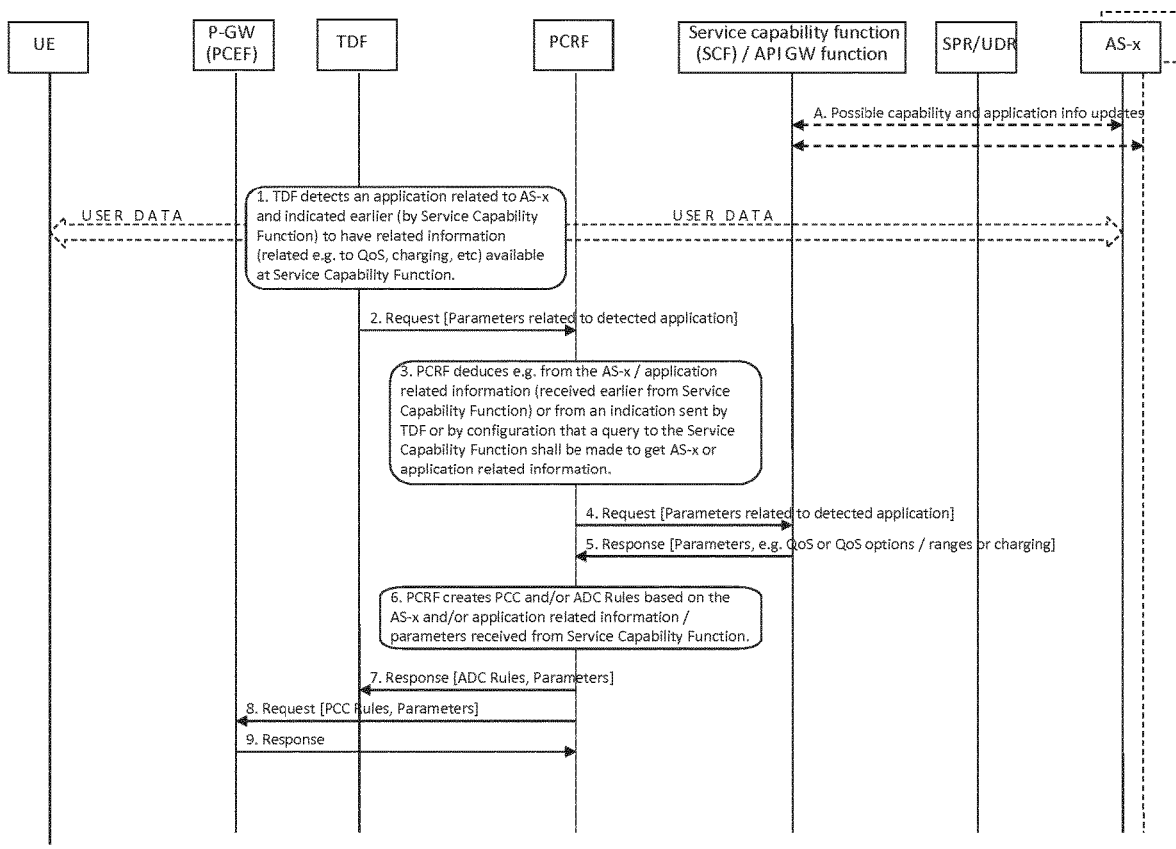
FIG. 3 illustrates a signaling scenario wherein a traffic detection function detects an application and related information is available at a service capability function, according to certain embodiments.

A further issue may include an indication of the availability of application specific policy information and the information itself, including, for example, acceptable quality of service (QoS) or QoS ranges, charging control. This indication may be used by the network, such as by PCRF, to provide initial ADC and policy and/or charging control (PCC) rules accordingly. As discussed in more detail below, an example of such an implementation is shown in FIG. 2, steps 7-13. This indication may also be used by the network without further session information provisioning when the network (ADC) detects the corresponding service start between the UE and AS-x, as shown in FIG. 3, steps 1-8, which is further described in detail below.

According to certain embodiments, AS-x may dynamically update the information to keep the SCF/network abreast of the latest status, and accordingly the SCF/network may dynamically update the status of the exposed services.

Further details of the required behavior of the related network functions (PCRF, TDF, SCF and AS-x) in various cases/embodiments are described in more detail below with reference to FIGS. 2, 3 and 4.

Even though a standalone TDF can be used in these examples/embodiments, the same procedures and measures may also apply, when TDF is integrated in P-GW, such as, for example, being collocated with PCEF, in P-GW. In this case message exchanges between PCRF and P-GW replace message exchanges between PCRF and TDF, as discussed below.

FIG. 2 illustrates an implementation of a signaling scenario where the AS and network (SCF) exchange information and a UE attaches to the network. As shown in FIG. 2, at step 1, SCF and AS-x exchange information. SCF exposes network services to AS-x. AS-x may indicate its capabilities and application related capabilities and parameters for different applications including the various issues indicated to the SCF/API GW described above.

At step 2, the UE can attach to the network via an attach request including parameters. At step 3, as a consequence of the UE attaching to the network, P-GW may obtain a request message for setting up a default session/context for the UE. At step 4, P-GW can request authorization and PCC rules for the session context from PCRF. Next, at step 5, PCRF may request the subscription profile/subscription parameters of the user from a subscription profile repository/user data repository (SPR/UDR). At step 6, the SPR/UDR may send the subscription profile/subscription parameters in its response to PCRF. The profile/parameters may contain/identify applications/services allowed for the user.

The PCRF may deduce, at step 7, for example, by configuration or from a prior setup of a control protocol with SCF or from the subscription profile/parameters that a query to the SCF is to be made. At step 8, the PCRF can send a request to SCF to get possible capability information related to AS-x and other application servers, and/or information related to applications/services offered by the application servers. The parameters in the request may identify applications/services allowed for the user. At step 9, SCF can send a response to PCRF. The response may contain capabilities of identified application servers and application related capabilities and parameters for different applications including, for example, the issues indicated to the SCF/API GW described above.

At step 10, the PCRF can use the information received from SCF and from SPR/UDR for creating ADC rules for TDF and/or PCC rules for P-GW that may include a policy and charging enforcement function (PCEF). PCRF may especially use the application server related information and/or application related information for deducing from/ deciding on which of the detected applications should make the TDF send a report to PCRF and which should not.

At step 11, PCRF may send a request message to TDF. The message may contain ADC rules. At step 12, TDF can send a response to PCRF. PCRF can send, at step 13, a response message to P-GW. The message may contain PCC Rules. The PCC rules may contain rules for policy enforcement for PCEF and/or rules for application detection, if TDF is integrated with PCEF in P-GW, in which case steps 11 and 12 can be omitted.

At step 14, P-GW can send a response to message 3. Finally, at step 15, the UE can get an acknowledgement for the attach request/message 2.

FIG. 3 illustrates another implementation of a signaling scenario where TDF can detect an application to have related information available at the SCF, according to certain embodiments. At step A, SCF and AS-x may exchange information to update the statuses. Here, SCF may update the status of network services to AS-x. AS-x may indicate its capabilities and application related capabilities and parameters for different applications including the issues indicated to the SCF/API GW described above.

At step 1, TDF can detect an application related to AS-x and indicated earlier (by SCF) to have related information, such as, for example, related to QoS, charging, available at the SCF. At step 2, TDF can send a message to PCRF to indicate the detection of an application. In addition to the regular application related information, the parameters may, but do not have to, indicate to PCRF a need to request further information from SCF.

The PCRF can, at step 3, deduce, for example, from the AS-x/application, related information received earlier from SCF, or from an indication sent by TDF in step 2 or by configuration that a query to the SCF shall be made to get application server/AS-x or application related information. At step 4, PCRF can send a request to SCF. The parameters in the request may identify the detected application and/or the application server, for example, through an IP address. At step 5, SCF can send a response to PCRF. The response may contain application related capabilities for the detected application and/or capabilities of the identified application server, such as, for example, the issues indicated to the SCF/API GW described above.

At step 6, PCRF can create PCC and/or ADC rules based on the application related information/parameters and/or the application server AS-x related information/parameters received from SCF. At step 7, PCRF can send a response message to TDF. The message may contain ADC rules. At step 8, PCRF may send a request message to P-GW. The message may contain PCC rules. The PCC rules may contain rules for policy enforcement for PCEF and/or rules for application detection, if TDF is integrated with PCEF in P-GW, in which case step 2 originates from P-GW, step 7 terminates at P-GW and steps 8 and 9 can be omitted. Finally, at step 9, P-GW can send a response to message 8 to PCRF.

Figure 4:
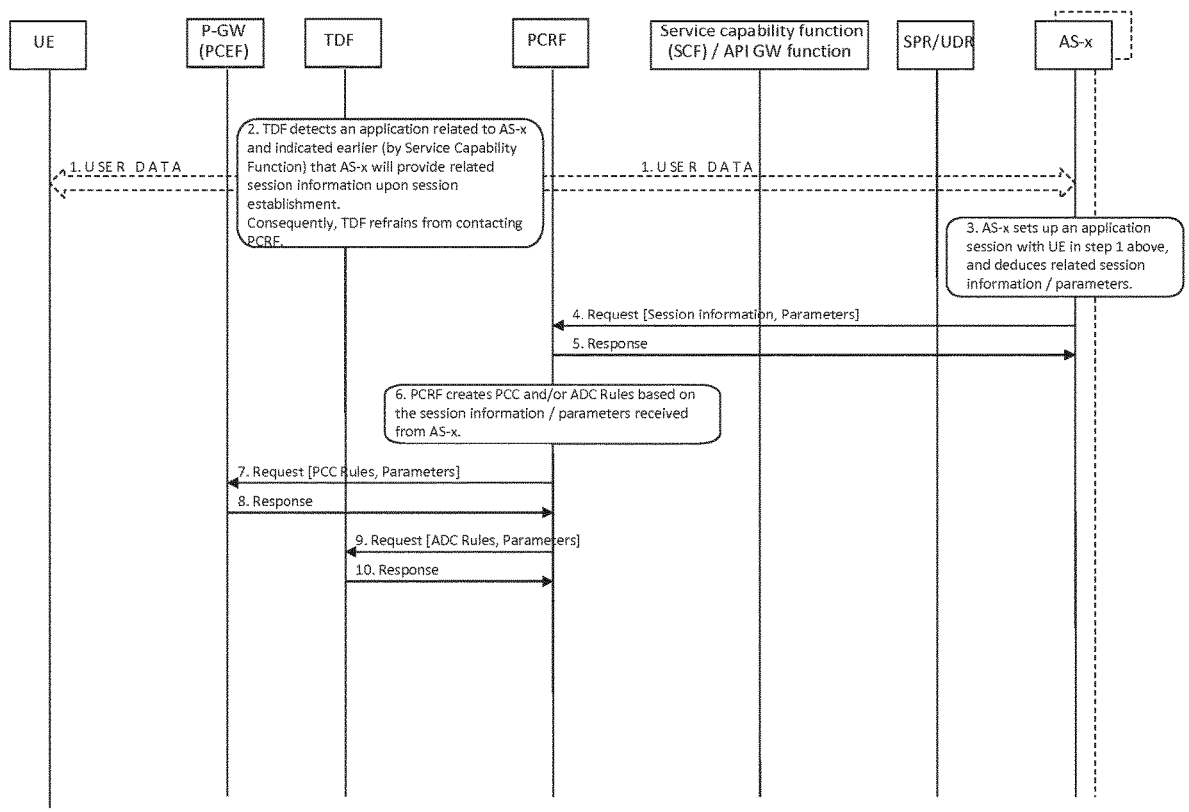
FIG. 4 illustrates a signaling scenario wherein the traffic detection function detects an application, related session information is available at an application server AS-x and a control interface exists between AS-x and a policy and/or charging enforcement function, according to certain embodiments.

FIG. 4 illustrates another implementation of a signaling scenario where TDF can detect an application to have related session information available at the application server AS-x and that a control interface exists between AS-x and PCRF. At step 1, a UE and an application server AS-x can exchange an IP packet/IP packets on the traffic channel/user plane. At step 2, TDF can detect an application related to the application server AS-x and indicated earlier (by SCF) that AS-x will provide related session information upon session establishment. Consequently, TDF can refrain from contacting PCRF.

At step 3, AS-x can set up an application session with UE in step 1 above, and deduce related session information/ parameters. At step 4, AS-x can send session information/ parameters in a request message to PCRF. At step 5, PCRF can send a response to AS-x. PCRF can, at step 6, create PCC and/or ADC rules based on the session information/ parameters received from AS-x.

At step 7, PCRF can send a request message to P-GW. The message may contain PCC rules. The PCC rules may contain rules for policy enforcement for PCEF and/or rules for application detection, if TDF is integrated with PCEF in P-GW, in which case steps 9 and 10 can be omitted. At step 8, P-GW can send a response to PCRF. At step 9, PCRF may send a request message to TDF. The message may contain ADC rules. Finally, at step 10, TDF can send a response to message 9 to PCRF.

Certain embodiments may have various benefits and/or advantages. For example, in certain embodiments, crucial elements may include PCRF, PCEF/TDF and the to-be-defined (under work in 3GPP) SCF/API GW. According to certain embodiments, these entities can adapt to the capabilities of external application servers to get the most of the available services and applications. This suggests a number of measures that can be applied either separately or in various combinations.

Figure 5:
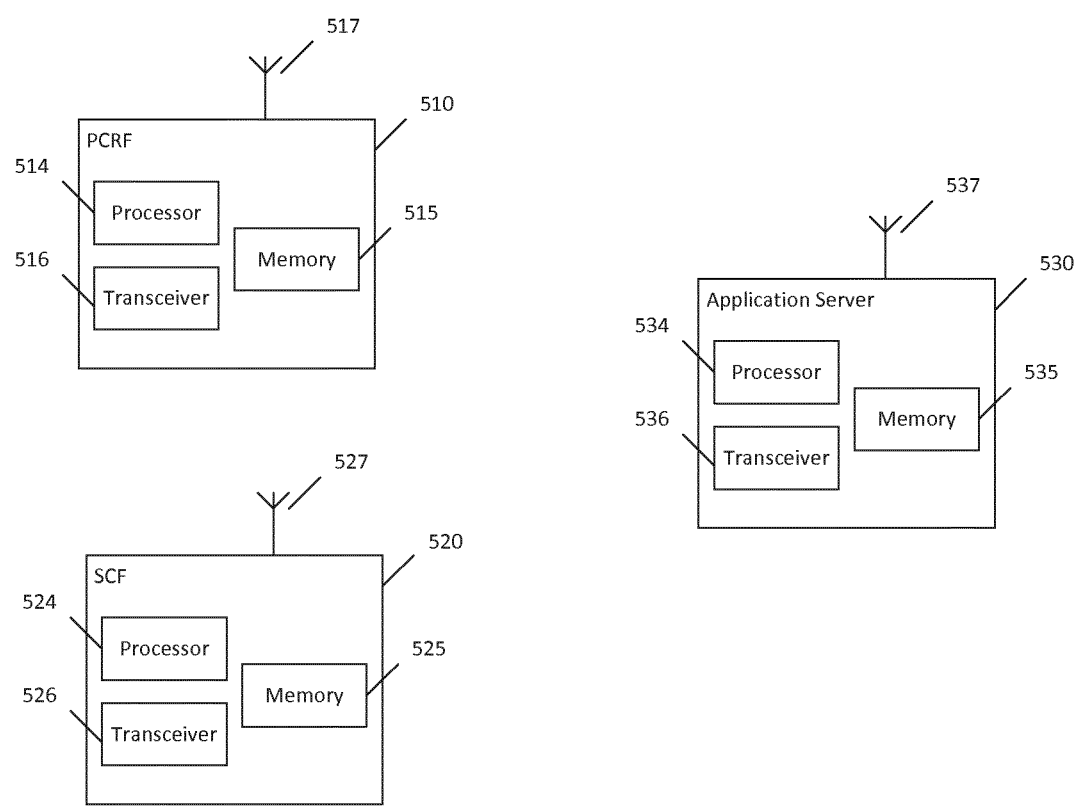
FIG. 5 illustrates a system according to certain embodiments.

FIG. 5 illustrates a system according to certain embodiments of the invention. In one embodiment, a system may include multiple devices, such as, for example, at least one first network element, such as, for example, PCRF 510, at least one second network element, such as, for example, SCF 520, and at least one third network element, such as, for example, application server 530.

Each of these devices may include at least one processor, respectively indicated as 514, 524, and 534. At least one memory can be provided in each device, and indicated as 515, 525, and 535, respectively. The memory may include computer program instructions or computer code contained therein. The processors 514, 524, and 534 and memories 515, 525, and 535, or a subset thereof, can be configured to provide means corresponding to the various blocks of FIG. 5.

Even though described as separate devices in FIG. 1, some of these devices, such as, for example, PCRF and SCF, may be integrated as functionalities in a single device.

As shown in FIG. 5, transceivers 516, 526, and 536 can be provided, and each device may also include an antenna, respectively illustrated as 517, 527, and 537. Transceivers 516, 526, and 536 can each, independently, be a transmitter, a receiver, or both a transmitter and a receiver, or a unit or device that is configured both for transmission and reception.

Processors 514, 524, and 534 can be embodied by any computational or data processing device, such as a central processing unit (CPU), application specific integrated circuit (ASIC), or comparable device. The processor can be implemented as a single controller, or a plurality of controllers or processors.

Memories 515, 525, and 535 can be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as PCRF 510, SCF 520, and application server 530, to perform any of the processes described herein (see, for example, FIGS. 2-4 and 6-8). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 5 illustrates a system including a PCRF, SCF, and application server, embodiments of the invention may be applicable to other configurations, and configurations involving additional elements. For example, not shown, additional core network elements may be present, as illustrated in FIGS. 1-4.

Figure 6:
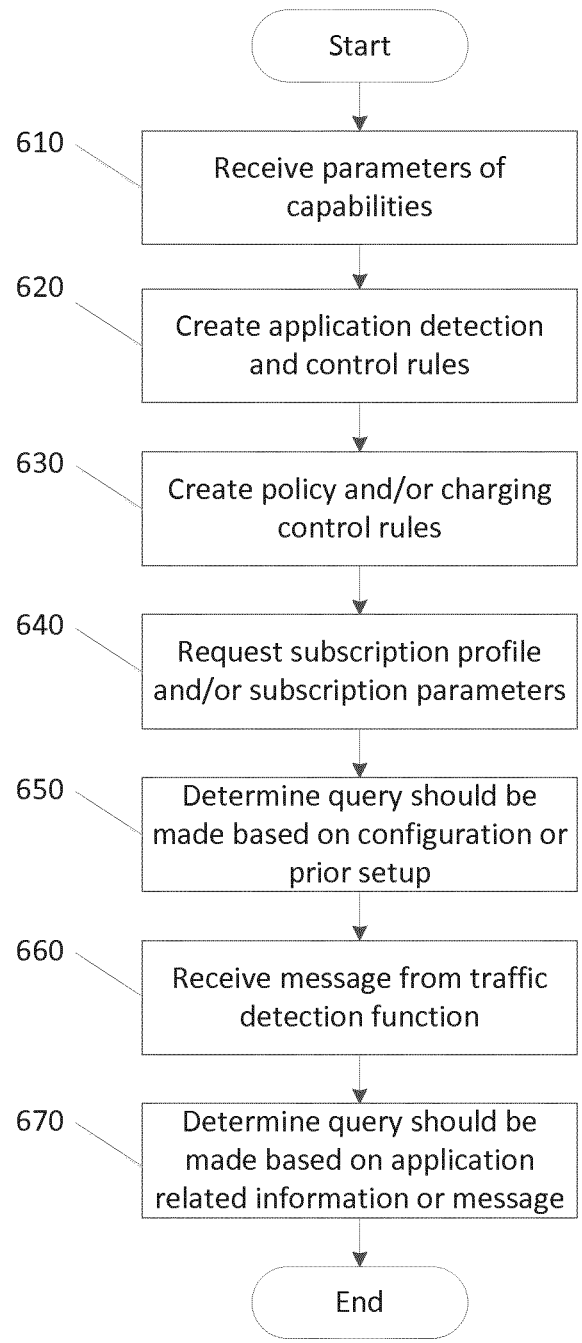
FIG. 6 illustrates a method according to certain embodiments.

FIG. 6 illustrates a method according to certain embodiments. As shown in FIG. 6, a method can include, at step 610, receiving parameters of capabilities relating to a first network element, such as, for example, an application server, at a second network element, such as, for example, a policy and charging rules function. The method can also include, at step 620, creating application detection and control rules. The application detection and control rules can be based on the parameters received.

The method can further include, at step 630, creating policy and/or charging control rules. The policy and/or charging control rules can be created based on the parameters received relating to the first network element. The method can also include, at step 640, requesting subscription profile and/or subscription parameters of a user. The subscription profile and/or subscription parameters can include applications and/or services that are allowed for the user.

The method can further include, at step 650, determining that a query to a third network element, such as, for example, a service capability function, should be made based on a configuration or a prior setup of a control protocol with the third network element, or from the subscription profile and/or subscription parameters of the user. The method can also include, at step 660, receiving a message from a fourth network element, such as, for example, a traffic detection function, at the second network element. The message can indicate detection of at least one of a plurality of applications. The method can also include, at step 670, determining that a query to the third network element should be made based on application related information or from the message sent by the fourth network element.

Figure 7:
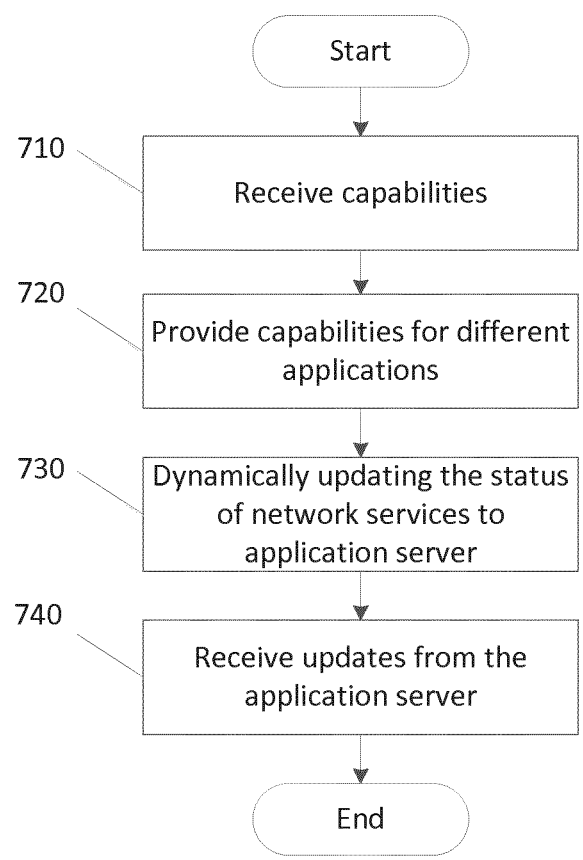
FIG. 7 illustrates another method according to certain embodiments.

FIG. 7 illustrates another method according to certain embodiments. As shown in FIG. 7, a method can include, at step 710, receiving capabilities and application related capabilities and parameters for different applications from a first network element, such as, for example, an application server. The method can also include, at step 720, providing the capabilities and application related capabilities and parameters for different applications to a second network element, such as, for example, a policy and charging rules function. The capabilities and application related capabilities and parameters can be provided in response to a request from the policy and charging rules function for the capabilities and parameters.

The method can further include, at step 730, dynamically updating the status of network services to the first network element based on updated indicators related to the first network element received from the first network element. The method can also or alternatively include, at step 740, receiving updates from the application server relating to services that the application server supports. The updates may indicate, for example, QoS and charging control related parameters related to the services that the application server supports.

Figure 8:
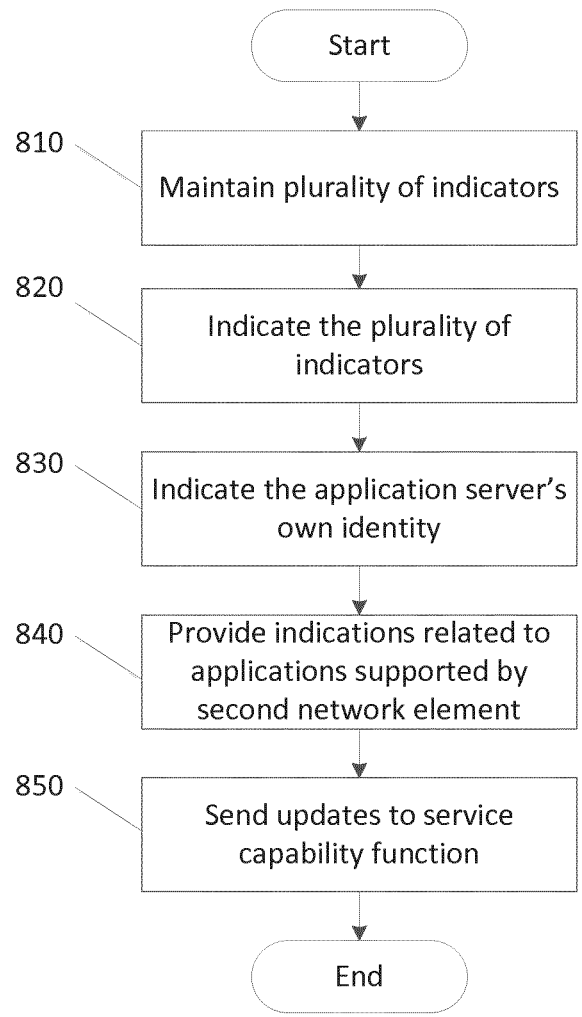
FIG. 8 illustrates yet another method according to certain embodiments.

FIG. 8 illustrates yet another method according to certain embodiments. As shown in FIG. 8, a method can include, at step 810, maintaining at least one of a plurality of indicators indicated to a first network element, such as, for example, a service capability function. The method can also include, at step 820, indicating the plurality of indicators related to a second network element, such as, for example, an application server. The plurality of indicators can be indicated from the second network element to the first network element.

The method can further include, at step 830, indicating the second network element's own identity to the first network element. The second network element's own identity can be indicated to the first network element by the second network element. The method can also or alternatively include, at step 840, providing indications related to applications supported by the second network element to the first network element. The method can further include, at step 850, sending updates from the application server to the service capability function relating to services that the application server provides.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

3GPP Third Generation Partnership Project
ADC Application Detection and Control
API Application Programming Interface
AS Application Server
ASIC Application Specific Integrated Circuit
CPU Central Processing Unit
GW Gateway
HDD Hard Disk Drive
IP Internet Protocol
IP-CAN IP Connectivity Access Network
OMA Open Mobile Alliance PCC Policy and/or Charging Control
PCEF Policy and Charging Enforcement Function
PCRF Policy and Charging Rules Function
P-GW Packet Data Network Gateway
QoS Quality of Service
RAM Random Access Memory
SCF Service Capability Function
SPR Subscription Profile Repository
TDF Traffic Detection Function
UDR User Data Repository
UE User Equipment

I claim:

1. A method, comprising:
   receiving capabilities relating to an application server at a policy and charging rules function,
   wherein the receiving further comprises receiving an indication whether or not the application server supports a control interface to provide session information to the policy and charging rules function when a user session is established between a user equipment and the application server; and
   creating application detection and control rules based on the capabilities received.

2. The method of claim 1, further comprising:
   requesting subscription profile and/or subscription parameters of a user,
   wherein the subscription profile and/or subscription parameters comprise applications and/or services allowed for the user.

3. An apparatus comprising:
   at least one processor; and
   at least one memory including computer program code,
   wherein the at least one memory and the computer program code are configured to, with the at least one processor, cause the apparatus at least to
   receive capabilities relating to an application server at a policy and charging rules function;
   receive an indication whether or not the application server supports a control interface to provide session information to the policy and charging rules function when a user session is established between a user equipment and the application server; and
   create application detection and control rules based on the capabilities received.

4. The apparatus of claim 3, wherein the at least one memory and the computer program code are configured to, with the at least one processor, cause the apparatus at least to request subscription profile and/or subscription parameters of a user, wherein the subscription profile and/or subscription parameters comprise applications and/or services allowed for the user.

* * * * *